W. L. IMLAY.
Churn.
No. 50,129. Patented Sept. 26, 1865.
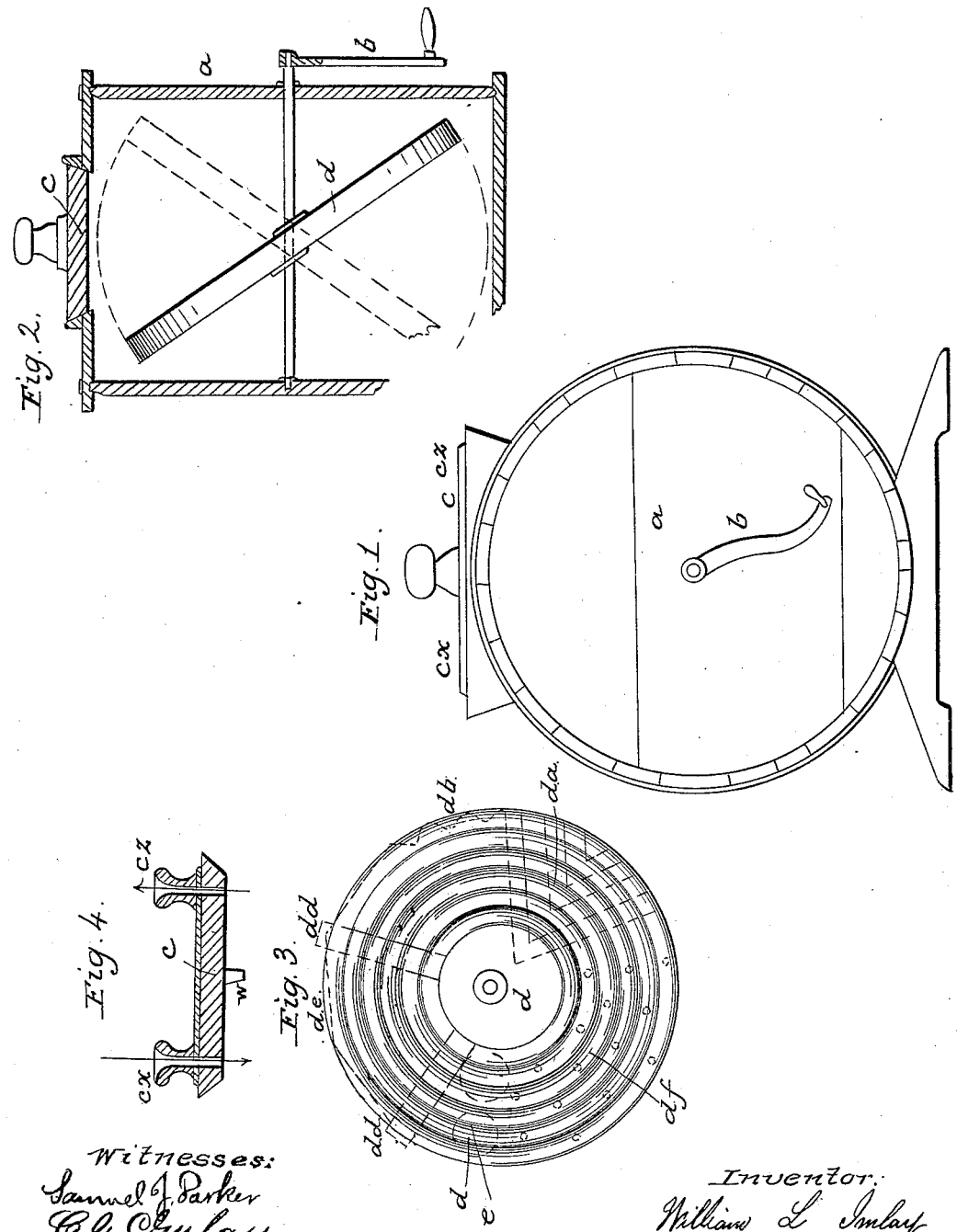

UNITED STATES PATENT OFFICE.

WILLIAM L. IMLAY, OF PHILADELPHIA, PENNSYLVANIA.

IMPROVEMENT IN CHURNS.

Specification forming part of Letters Patent No. 50,129, dated September 26, 1865.

*To all whom it may concern:*

Be it known that I, WILLIAM L. IMLAY, of the city and county of Philadelphia, and State of Pennsylvania, have invented an Improvement in Churns; and I do hereby declare that the following is a full and exact description thereof, reference being had to the annexed drawings, and to the letters of reference marked thereon.

My object is to make a simple and efficient churn, made of few parts, easily cleaned and kept in order. This I accomplish by making a plain cylindrical chamber or holder for the cream, or milk and cream, and water or other articles mixed therewith. Through the longitudinal axis of the said chamber or reservoir I fix a shaft, and on this shaft I fix an oblique disk or wheel, in any convenient manner, either permanent or in adjustable parts, the said disk or wheel thus, with its plane inclined to its axis, being either smooth, roughened, or feathered, with or without grooves, holes, or other devices for the circulation of air. By the revolution of the said disk or inclined wheel, occupying in its revolution nearly the whole of the cavity of the churn, the contents of the churn are most intimately mixed, stirred, and subjected to the action of the air, and the butter is readily and easily separated from the buttermilk, and the process of churning completed.

Figure 1 is a perspective view of my churn; and Fig. 2 are parts thereof, more clearly seen; and Fig. 3 are other parts thereof.

In Fig. 1, $a$ is the shell of the cylinder of the usual barrel-churn, and $b$ is the crank by which the inner parts are turned.

Fig. 2 shows a section of my churn. In it $a$ is the shell or barrel, and $b$ is the crank, and $e$ the stopper of the churn, and $d$ is a plain disk or wheel set obliquely or inclined to its axis, and whose motions laterally are indicated by the red dotted lines.

In Fig. 3, $d$ is the oblique or inclined disk or wheel, not represented as perfectly plain in its surfaces, but with corrugations on its surface, and by red lines and shades and spots of color other variations, of which a large number can be named, are represented. Thus, $d\ a$ is one plan of transverse corrugations, $d\ b$ is a cutting of a waved periphery or circumference of the wheel, $d\ c$ is one form of a polysided wheel, $d\ d$ are paddles or feathers attached to the wheel, $d\ e$ represent large holes made through the wheel, and $d\ f$ a series of small holes made either through the wheel or into a series of air-chambers in the disk or wheel. The wheel also is made, when desirable, of arms instead of solid, or with two disks or wheels set either parallel or opposite to each other. The shaft is represented as horizontal, but may be made oblique, perpendicular, or otherwise. Also, in these figures, $c$ is the stopper of the churn removed, and in it $c\ x$ is a knob or handle through which the left-hand vent, with its cup, is made, and by the action of the disk or wheel air is drawn into it, as indicated by the red arrow, which air escapes by the other knob or handle $o\ z$, as also indicated by the arrow through it, the partition $z$ aiding in this constant circulation of the air while the churn is in motion.

The use of this churn is apparent to those skilled in the art to which it appertains, the power of the churn being very great, the agitation of the contents severe, the aeration complete, and it is believed that as the butter is separated and collected a peculiar working and perfection of the product is secured, and that in an increased quantity over ordinary churns.

I do not claim placing the dasher of a churn in an oblique position to the axis; but What I do claim is—

The constructing the dasher of a single flat disk or wheel, set at an angle of forty-five degrees, or thereabout, to the axis of the shaft by which it is rotated, the body of the churn having such length and diameter that the oblique disk shall sweep near the inner surface of both ends and sides, as and for the purpose specified.

W. L. IMLAY.

Witnesses:
   C. G. IMLAY,
   SAMUEL J. PARKER.